United States Patent [19]

Quataert

[11] Patent Number: 4,727,711

[45] Date of Patent: Mar. 1, 1988

[54] MOWING DEVICE

[75] Inventor: P. Quataert, Nuenen, Netherlands

[73] Assignee: P. J. Zweegers en Zonen B.V., Geldrop, Netherlands

[21] Appl. No.: 911,214

[22] Filed: Sep. 24, 1986

[30] Foreign Application Priority Data

Nov. 15, 1985 [NL] Netherlands .................. 8503156

[51] Int. Cl.$^4$ .................................. A01D 34/74
[52] U.S. Cl. .................................. 56/16.2; 56/13.6; 56/192
[58] Field of Search ............ 56/13.6, 6, 192, 17.2, 56/16.2, 15.9

[56] References Cited

U.S. PATENT DOCUMENTS

| | | |
|---|---|---|
| 2,697,319 | 12/1954 | Porter ............ 56/13.6 |
| 3,751,889 | 8/1973 | Overesch ............ 56/13.6 |
| 3,857,225 | 12/1974 | Knudson ............ 56/13.6 |
| 3,893,283 | 7/1975 | Dandl ............ 56/13.6 |
| 4,178,746 | 12/1979 | Allely ............ 56/13.6 |
| 4,231,216 | 11/1980 | Weber ............ 56/13.6 |
| 4,286,423 | 9/1981 | Caldwell et al. ............ 56/13.6 |
| 4,302,921 | 12/1981 | Weber ............ 56/6 |
| 4,384,444 | 5/1983 | Rossler, Jr. ............ 56/13.6 |
| 4,426,828 | 1/1984 | Neuerburg ............ 56/6 |
| 4,633,656 | 1/1987 | Willinger ............ 56/13.6 |

FOREIGN PATENT DOCUMENTS

| | | | |
|---|---|---|---|
| 2068206 | 8/1981 | United Kingdom | 56/13.6 |
| 2166032 | 4/1986 | United Kingdom | 56/13.6 |

Primary Examiner—Paul J. Hirsch
Attorney, Agent, or Firm—Edmund M. Jaskiewicz

[57] ABSTRACT

Mowing device provided with a frame supported by ground wheels which can be coupled to a vehicle by means of a drawbar, and with a number of cutting means arranged side by side when seen in the intended direction of movement of the mowing device during operation, said cutting means being rotatable about upwardly extending axes of rotation and being provided with knives, said cutting means being supported during operation by at least two skids arranged near the outermost cutting means and being in contact with the ground behind the foremost points of the paths described by the knives of the cutting means, while the frame part supporting the cutting means can move resiliently relative to the ground wheels, whereby the drawbar is adjustable relative to the frame about a pivot axes extending transverse to the intended direction of movement during operation.

9 Claims, 6 Drawing Figures

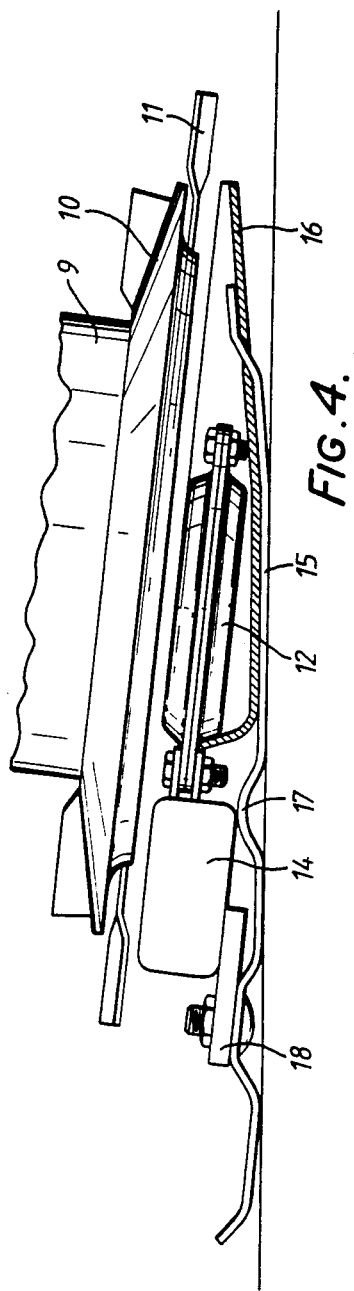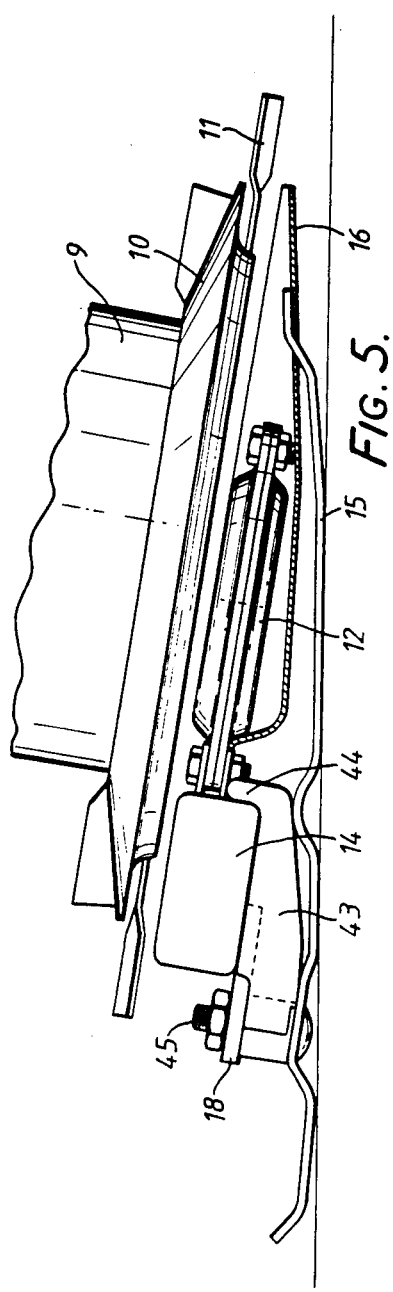

MOWING DEVICE

The invention relates to a mowing device provided with a frame supported by ground wheels which can be coupled to a vehicle by means of a drawbar, and with a number of cutting means arranged, side by side when seen in the intended direction of movement of the mowing device during operation, said cutting means being rotatable about upwardly extending axes of rotation and being provided with knives, said cutting means being supported during operation by at least two skids arranged near the outermost cutting means and being in contact with the ground behind the foremost points of the paths described by the knives of the cutting means, whilst the frame part supporting the cutting means can move resiliently relative to the ground wheels.

With known mowing devices of this kind the construction is made such that only a comparatively small part of the weight of the device is transferred to the ground via the skids supporting the cutting means, whilst the larger part of the weight is taken up by the ground wheels and the cutting means can move resiliently up and down.

In some applications, such as e.g. on very rough land or on land with a comparatively great number of stones in the ground it is often desirable to adjust the cutting means to a higher cutting height than usual. In order to meet this demand it has been proposed to make the skids supporting the cutting means vertically adjustable. It has become apparent, however, that an important disadvantage hereby is that as a result of that a larger part of the weight of the mowing device is transferred to the ground via the skids, as a result of which it becomes more difficult for the cutting means to follow unevennesses in the ground and the skids will tend to form channels in the ground, resulting in the loss of the intended higher cutting height and damage to the grassland.

It is aimed by the invention is to obtain a mowing device of the above kind wherein the cutting means can simply be adjusted vertically while avoiding the disadvantages described above.

According to the invention this can be achieved because the drawbar is adjustable relative to the frame about a pivot axes extending transverse to the intended direction of movement of the mowing device during operation.

Because the outer end of the drawbar which is coupled to the vehicle is kept at a fixed height tilting of the mowing device can be effected on pivoting of the drawbar relative to the frame, such that the cutting means arranged in a row will tilt about the parts of the skids resting on the ground, as a result of which the axes of rotation of the cutting means will move more toward the vertical position and because of that the lowest point of the path described by the knives of the cutting means will get a higher position. Due to this tilting the part of the weight of the mowing device which is transferred to the ground wheels by the spring-loaded mechanism will remain the same or possibly even increase a little, so that a good ground adjustment of the cutting means is still ensured and it is not necessary for the skids to transfer an undesirably large part of the weight of the mowing device to the ground.

The invention will be more fully explained hereinafter with reference to a possible embodiment of the construction according to the invention illustrated in the accompanying figures.

FIG. 4 is a side view of a part of a drum and a skid located thereunder.

FIG. 5 is a side view of an altered embodiment corresponding with FIG. 4.

Figure 1:
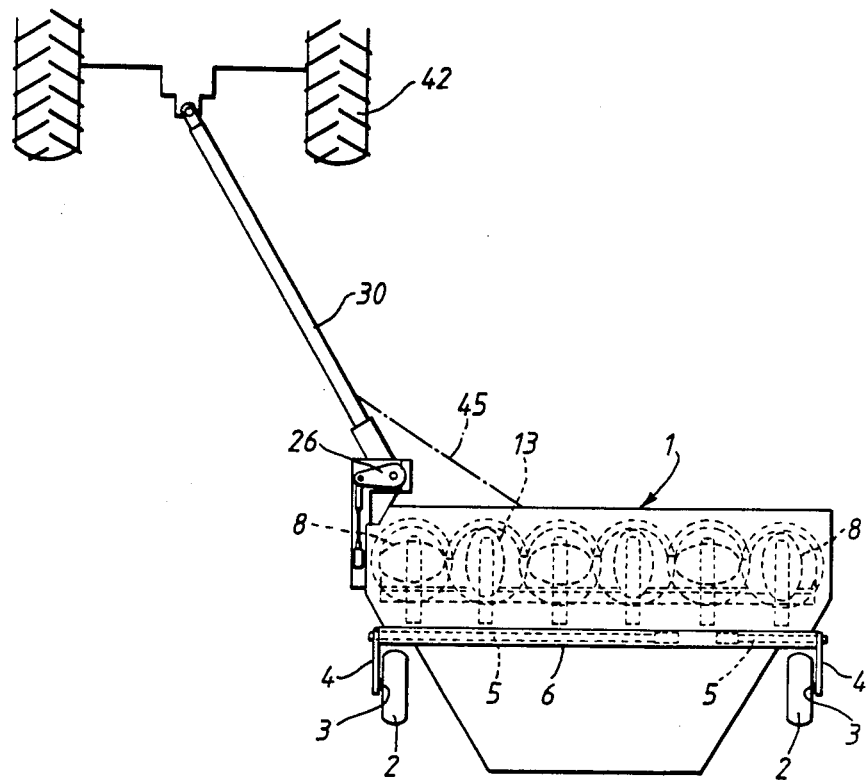
FIG. 1 is a diagrammatic top view of a mowing device according to the invention.

The mowing device illustrated in the figures comprises a frame 1 which is supported by a pair of ground wheels 2. The ground wheels are mounted freely rotatable on the outer ends of arms 4 by means of axles 3 being in line. The outer ends of the arms 4 facing away from the axles 3 are fixed to the outer ends of torsion bars 5, which are accommodated in a hollow frame beam 6 and are fixed at their outer ends facing away from the arms 4.

The frame further comprises a hollow frame beam 7 supporting a cutting means 8 at each of its outer ends, said cutting means being provided with a drum 9 and a disc 10 fixed to the lower end of the drum. Cutting blades or knives 11 are pivotally mounted on the disc 10 in the usual manner.

The two cutting means 8 are also supported by a hollow flat gearbox casing 12 extending under the cutting means parallel to the beam 7. On said gearbox casing 12 there are mounted four disc-shaped cutting means 13 located between the outer cutting means 8, such that the axes of rotation of said cutting means 13 extend parallel to the axes of rotation of the cutting means 8.

To the gearbox casing 12 there is fixed a beam 14 extending parallel to said gearbox casing. Furthermore a skid 15 formed by a spring steel strip extends under each cutting means. The front end of the skid 15 is put through an opening provided in a guard plate 16 which is located under the cutting means. An upwardly bent part 17 of the skid 15 bears against the beam 14 and at some distance of said upwardly bent part the skid 15 is fixed to a plate-shaped support 18 protruding behind the beam 14 by means of a bolt not shown. Furthermore the skid is provided with an extension freely protruding behind said support 18.

A more detailed description of such skids has been given in the prior Dutch patent application No. 8403245.

The frame is furthermore provided with a beam 19 extending to the front. To the outer end of said beam there is fixed a support 20 in which a bush 21 is journalled. The bush has an outer surface forming part of a sphere and is accommodated in a correspondingly shaped hole in the support 20, so that the bush is adjustable.

Furthermore a plate 24 is fixed to the beam 19. By means of a vertical pivot pin 25 an arm 26 is pivotally coupled to the plate 24. In the arm 26 a bush 27 corresponding with the bush 21 is journalled. Accommodated in the bushes 21 and 27 are pins 28,29 respectively, being in line, whose outer ends extending outside the bushes 21 and 27 are connected to the outer end of a drawbar 30. Pin 29 is thereby put through a slotted hole in plate 24.

To the outer end of the arm 26 facing away from the pin 25 there is pivotally coupled a coupling piece 32 by means of a pin 31 extending parallel to the pin 25. The coupling piece 32 is provided with a bore into which an outer end of a rod 33 is screwed. The rod 33 is guided displaceably in a U-shaped support 34 fixed to the beam 19.

Figure 3:
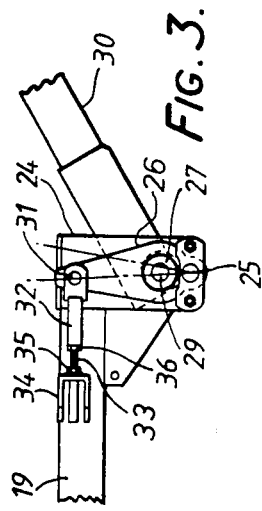
FIG. 3 is a top view of a part of FIG. 2.

Displacement of said rod from the position illustrated in FIG. 3 to the left is prevented by a nut 35 fixed to the rod. The rod can be screwed more or less deep into the coupling means 32 and be fixed relative to said coupling means by means of a nut 36 screwed on the rod.

Figure 2:
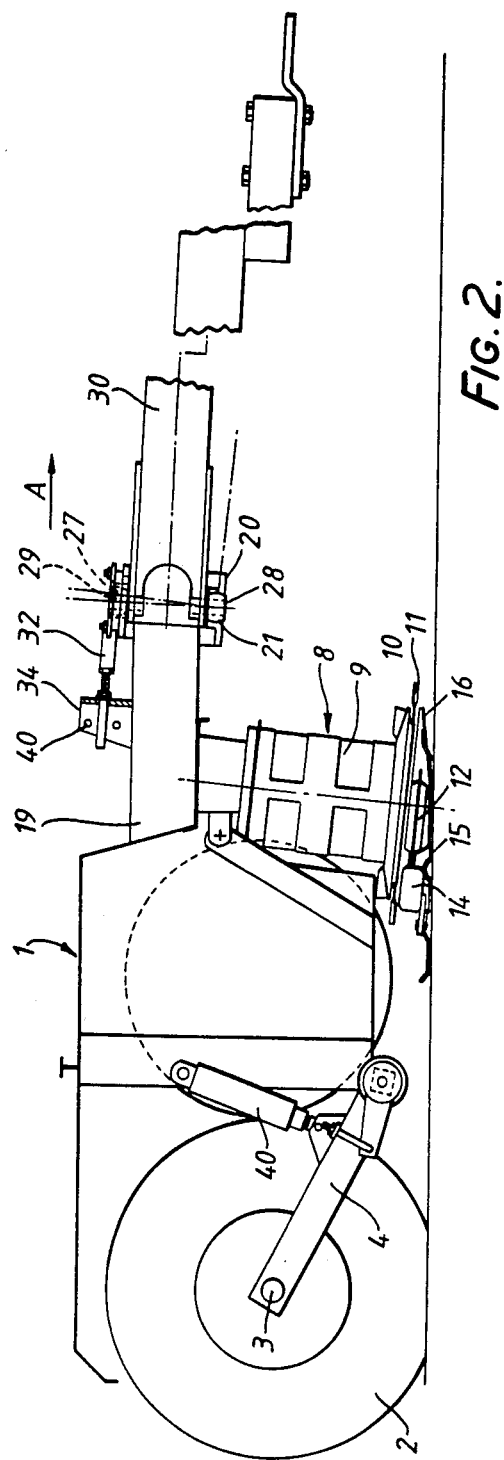
FIG. 2 is a larger-scale side view of a part of the device illustrated in FIG. 1.

As is furthermore illustrated in FIG. 2 setting cilinders 40 are provided between the arms 4 supporting the ground wheels 2 and the frame by means of which the ground wheels can be pivoted relative to the frame.

FIG. 2 shows the normal operating position, whereby the skids located under the cutting means rest on the ground. The construction is thereby such that the larger part of the weight of the device is transferred to the ground wheels 2 via the spring mechanism formed by the torsion bars 5, so that the skids are pressed on the ground with relatively little force making it thus possible for the cutting means to adjust well to unevennesses in the ground. The axes of rotation of the cutting means 8 and 13 thereby normally include an angle of ±5° with the vertical.

When the device is used on rough land or on land with a comparatively large number of stones in the ground it may be desirable that in their lowest position the knives 11 are located higher above the ground than is usual with normal mowing. According to the invention a simple and quick height adjustment can now be effected by pivoting of the arm 26. When viz. the arm 26 is pivoted clockwise, seen in FIG. 3, by rotating of the rod 33, the upper pin 29, seen in FIG. 2, connected to the drawbar 30, will be displaced into the direction according to arrow A, so that, therefore, the pivot axis about which the drawbar can pivot relative to the frame will tend to pivot clockwise, seen in FIG. 2. The drawbar 30, therefore, will then tend to pivot relative to the remaining part of the frame about an imaginary pivot axis extending more or less parallel to the row of cutting means.

The front end of the drawbar 30, however, is coupled to a vehicle such as a tractor 42 towing the device during operation, so that said outer end is kept at a fixed height. Consequently the above mentioned pivoting of the arm 26 will result in the upward movement of the coupling point of the drawbar 30 to the frame beam 9. This leads to tilting of the cutting means about the ends of the skids protruding behind the cutting means into an anti-clockwise direction, seen in FIG. 2, so that the angle between the axes of rotation of the cutting means and the vertical decreases a little and consequently the lowermost position of the knives will be higher above the ground. With said tilting the part of the weight of the mowing device transferred to the wheels 2 via the torsion bars will remain the same or possibly increase a little, so that the load on the skids 15 will not increase and the good ground adjustability of the cutting means is maintained. When the arm 26 is pivoted back by means of the screwed rod 33 the mowing device will move back again to the position shown in FIG. 2.

Figure 6:
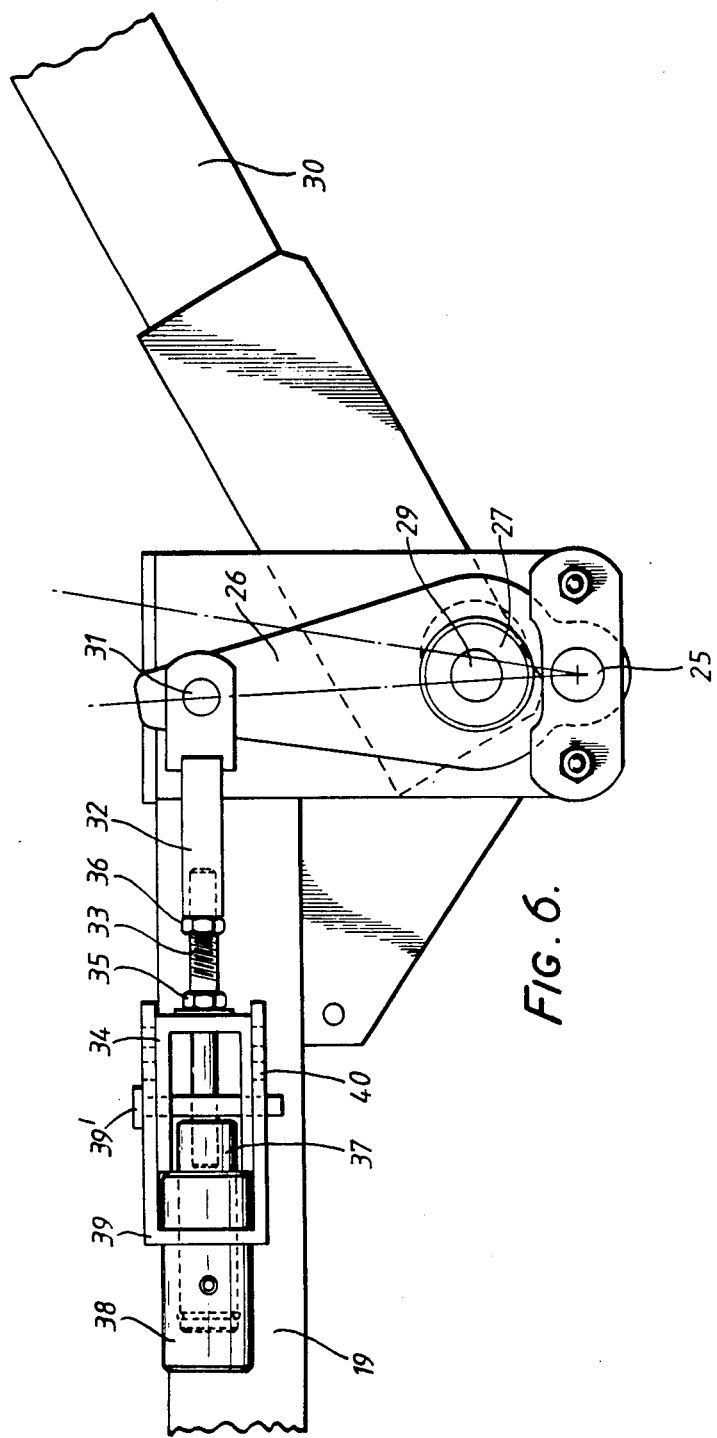
FIG. 6 is a view of an altered embodiment corresponding with FIG. 3.

With the embodiment illustrated in FIG. 6 the outer end of the rod 33 facing away from the lever 26 is connected to a plunger 37 of a setting cilinder 38. The setting cilinder 38 is mounted on a U-shaped support 39 which is fixed to the support 34 by means of a pair of pins 39' put through holes provided in the supports 34 and 39. Seen in the longitudinal direction of the setting cilinder several holes 40, being in line, are provided in the support 39, so that the support 39 can be fixed to the support 34 in several positions, Because the arm 26 can pivot here by means of a hydraulic setting cilinder, which can be operated by means of a valve mechanism provided on the tractor towing the mowing device, the adjustment of the cutting height can be done by the driver of the tractor during operation, so that an optimum adjustment of the cutting height will be possible for all operations at all times. This may be useful e.g. when cutting flattened crops, whereby dependent on whether the direction of movement is the same as the direction in which the crop is flattened or opposite thereto it may be desirable to use various cutting heights.

Because the support 39 can be fixed to the support 34 in several positions, there can be used a simple setting cilinder 38 which always makes its entire stroke for the intended adjustment, whilst yet several adjusting possibilities can be realised in a simple manner.

The machine described hereinabove can simply be transformed, while maintaining all possibilities indicated above, into a mowing device wherein the axes of rotation of the cutting means include different angles with the vertical. For this purpose it is only necessary, al illustrated in FIG. 5, to provide a filling piece 43 between each skid 15 and the beam 14, as illustrated in FIG. 5.

The filling piece 43 grips around the beam 14 with a nose 44 and each support 18 is partly accommodated in an opening provided in a relevant filling piece. The filling pieces 43 and the skids 15 are again fixed to the supports 18 by bolts 45.

As further appears from the FIGS. 2, 3 and 5 the rear ends of the skids made of spring steel freely protrude beyond the fixing points of the skids 15 to the supports 18. Said spring-loaded protruding ends absorb bumps when the cutting means hit the ground and rebound which advantageously influences the life of the mowing device.

Of course changes and/or additions to the embodiment described hereinabove will be possible within the spirit and scope of the invention. Thus the drawbar 30 may e.g. be pivotally coupled to the frame by means of a horizontal pin extending parallel to the row of cutting means, in which case adjusting means will be provided by means of which the drawbar can pivot about said pin relative to the frame.

For transport the device can be lifted by pivoting of the arms 4 relative to the frame by means of the setting cilinders 40.

The drawbar 30 can be pivoted thereby about the pivot axes formed by the pins 28 and 29 by means of a setting cilinder 45 only diagrammatically indicated in FIG. 1, so that the mowing device will take a position behind the tractor.

I claim:

1. A mowing device having a direction of movement during operation and comprising a frame, wheels on said frame for supporting said frame on the ground, a plurality of cutting means disposed in side by side relation transversely to said direction of movement carried by said frame and rotatable about substantially upward extending axes of rotation, said cutting means having knives thereon defining substantially circular cutting paths when in operation, a plurality of resilient skids supporting said cutting means and contacting the ground rearwardly of the foremost portions of the cutting paths of said knives such that said frame is supported resiliently with respect to said ground wheels, means on said frame for defining a substantially vertical pivot axis for pivotable connection to a draw bar coupled to a vehicle, and means on said frame for tilting said vertical pivot axis in a vertical plane parallel to the direction of movement such that said draw bar is adjusted relative to said frame around a horizontal axis transverse to the direction of movement whereby the rotary axes of said cutting means are tilted in planes parallel to the direction of movement.

2. A mowing device as claimed in claim 1 wherein said skids are in contact with the ground behind the axis of rotation of the cutting means with respect to said direction of movement.

3. A mowing device as claimed in claim 1 wherein said skids comprise strips of spring steel having fixed points and freely protruding portions extending behind the rearmost fixed points of the skids.

4. A mowing device as claimed in claim 1 wherein a said skid is disposed under each of said cutting means.

5. A mowing device as claimed in claim 1 wherein said vertical pivot axis defining means comprises a pair of axially aligned pins protruding above and below a draw bar, said pins being journaled in omnilaterally pivotally supported bushes, a member adjustably mounted on said frame, at least one of said bushes being mounted in said adjustable member.

6. A mowing device as claimed in claim 5 wherein said member comprises an arm mounted for pivotal movement with respect to said frame about a vertical axis spaced from the bush mounted in said member.

7. A mowing device as claimed in claim 6 and further comprising a screw spindle shaft connected to said arm and said frame to selectively pivot and adjust said arm.

8. A mowing device as claimed in claim 6 and further comprising a power cylinder connected to said arm and said frame to selectively pivot and adjust said arm.

9. A mowing device as claimed in claim 8 and further comprising means on said frame for selectively positioning said power cylinder in a plurality of positions parallel to the longitudinal axis of the power cylinder.

* * * * *